(12) United States Patent
Cheng

(10) Patent No.: US 6,716,140 B2
(45) Date of Patent: Apr. 6, 2004

(54) DISPLAY FOR AN EXERCISE DEVICE

(76) Inventor: Huan-Yu Cheng, No. 14, Alley 2, Lane 437, Pen Tun Rd., Taichung (TW)

( * ) Notice: Subject to any disclaimer, the term of this patent is extended or adjusted under 35 U.S.C. 154(b) by 12 days.

(21) Appl. No.: 10/235,202

(22) Filed: Sep. 5, 2002

(65) Prior Publication Data

US 2004/0048719 A1 Mar. 11, 2004

(51) Int. Cl.$^7$ ................................................. B62K 21/12
(52) U.S. Cl. .......................... 482/8; 482/902; 73/866.3; 248/904
(58) Field of Search ................................ 482/126, 909, 482/1, 8, 51, 54, 57, 71, 72, 900–902; 13/866.3; 248/904; 74/551.1, 551.8

(56) References Cited

U.S. PATENT DOCUMENTS 4,687,072 A * 8/1987 Komuro ..................... 180/219
6,305,241 B1 * 10/2001 Masui ........................ 74/551.8
6,546,807 B2 * 4/2003 Carrick ....................... 73/806.3

* cited by examiner

Primary Examiner—Glenn E. Richman
(74) Attorney, Agent, or Firm—Jackson Walker, LLP

(57) ABSTRACT

A display for an exercise device has a cylindrical housing formed from a rear half shell and a front half shell. The housing has an inner space and two open ends, and a support rod of the body-build can pass through the inner space and extend out from the open ends. A positioning hole is defined in the support rod, and a positioning stub corresponding to the positioning hole is formed in the inner space of the housing. The positioning stub is mounted in the positioning hole to prevent the housing from rotating on the support rod. Two fasteners are securely and respectively formed on the housing in the inner space fasten the rear and front half shell together to form the housing.

4 Claims, 4 Drawing Sheets ically to the PCB (16).

DISPLAY FOR AN EXERCISE DEVICE

BACKGROUND OF THE INVENTION

1. Field of the Invention

The present invention relates to a display, and more particularly to a display mounted on an exercise device without any bolts and screws and having a scarf joint and a positioning stub to orient the display on the exercise device.

2. Description of Related Art

People should do a physical activity such as walking or running to stay healthy and make the body stronger. In modern society, people in cities are always busy in business and at work. Therefore, many people in cities spend time in gyms and health clubs to exercise. There are many types of exercising devices such as stationary bicycles, treadmills, or cross-country trainers in gyms and health clubs, and many of them have a display to show the speed, the settings, time, etc.

With reference to FIG. 4, a display is often mounted on a base plate (41) welded to a support (40) of an exercise device. Four threaded screw holes (42) are formed in the base plate (41). A seat (50) with four holes (51) corresponding to the threaded screw holes (42) is attached to the base plate (41) with four screws (52) placed through the holes (51) and screwed into the threaded screw holes (42). A lip (53) is formed around the seat (50), and two slots (54) are defined in the lip (53) facing each other.

The display further comprises a housing (55) with a top surface (56) and a sidewall (57) around the top surface (56). A display panel (561) and at least one pushbutton (562) are defined on the top surface (56), and two ribs (58) corresponding to the slots (54) are defined on the sidewall (57). The sidewall (57) of the housing (55) corresponds to lip (53) of the seat (50) so that the sidewall (57) of the housing (55) can just fit into the lip (53) of the seat (50). The ribs (58) engage the corresponding slots (54) so that the display housing (55) is held in the seat (50).

However, the structure of the conventional display instrument mounted on the exercise device is inconvenient for a number of reasons. First the base plate (41) must be shaped to accommodate both the display and the support (40) and it must be welded onto the support (40). At some point, holes must be bored in the base plate (41) and tapped to accommodate the screws (52) used to fasten the seat (50) to the base plate (41). The foregoing actions cause some shortcomings that include:

increase in time to fabricate parts and

Every part of the display must be designed and fabricated in a specific designed shape. This will increase the time to manufacture the parts.

increase in complexity of assembly.

Due to the numerous parts, the structure of which is complex, a worker must spend more time manually assemble the parts. For example, a worker has to weld the base plate (41) to the support (40) and screw the seat (50) to the base plate (41).

To overcome the shortcomings, the present invention provides an improved display for exercise devices to mitigate or obviate the aforementioned problems.

SUMMARY OF THE INVENTION

The main objective of the invention is to provide an improved display for exercise devices. The display comprises a cylindrical housing with an inner space and two open ends. The housing consists of a rear half shell and a front half shell. Both half shells have an inside surface and an outside surface, and two fasteners are defined respectively on the inside surface of both half shells to fasten the half shells together to form the housing. A positioning stub is formed on the inside surface of the rear half shell. A window and at least a pushbutton are formed on a flat surface defined on the outside surface of the front shell. A printed circuit board (PCB) with a liquid crystal display (LCD) display panel is attached to the inside surface of the front half shell so the display panel can be viewed through the window in the flat surface.

A support rod with a positioning hole adapted to hold the positioning stub and the half shells are mounted around the support rod. The support rod extends out from the open ends of the housing. The positioning stub is mounted in the positioning hole to prevent the housing from rotating around the support rod.

Thus, assembling the half shells to form the housing and attaching the display to an exercise device without welding, boring or screwing is easy.

Other objects, advantages and novel features of the invention will become more apparent from the following detailed description when taken in conjunction with the accompanying drawings.

DETAILED DESCRIPTION OF PREFERRED EMBODIMENT

Figure 1:
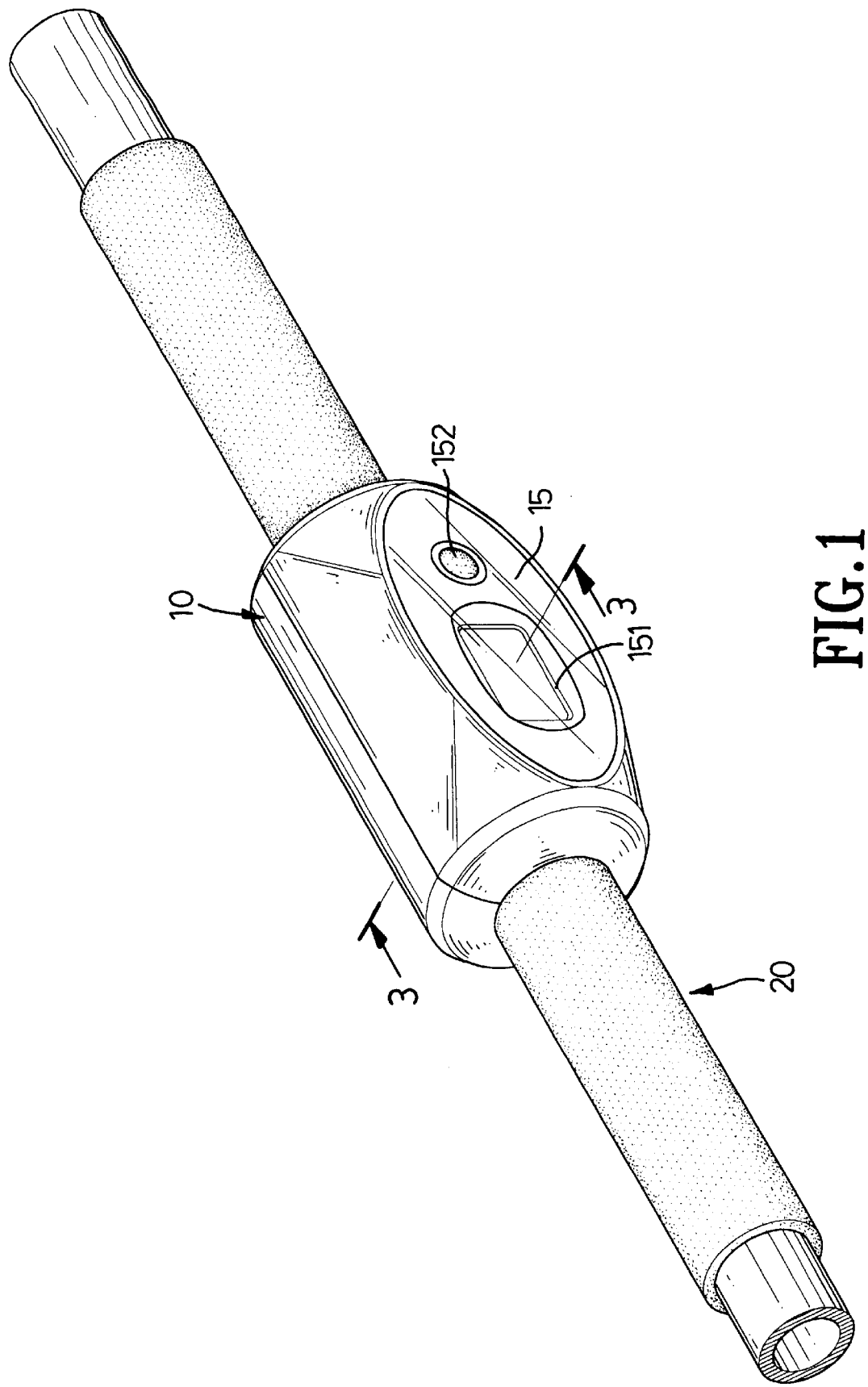
FIG. 1 is an operational perspective view of the display of an exercise device in accordance with the present invention.
Figure 2:
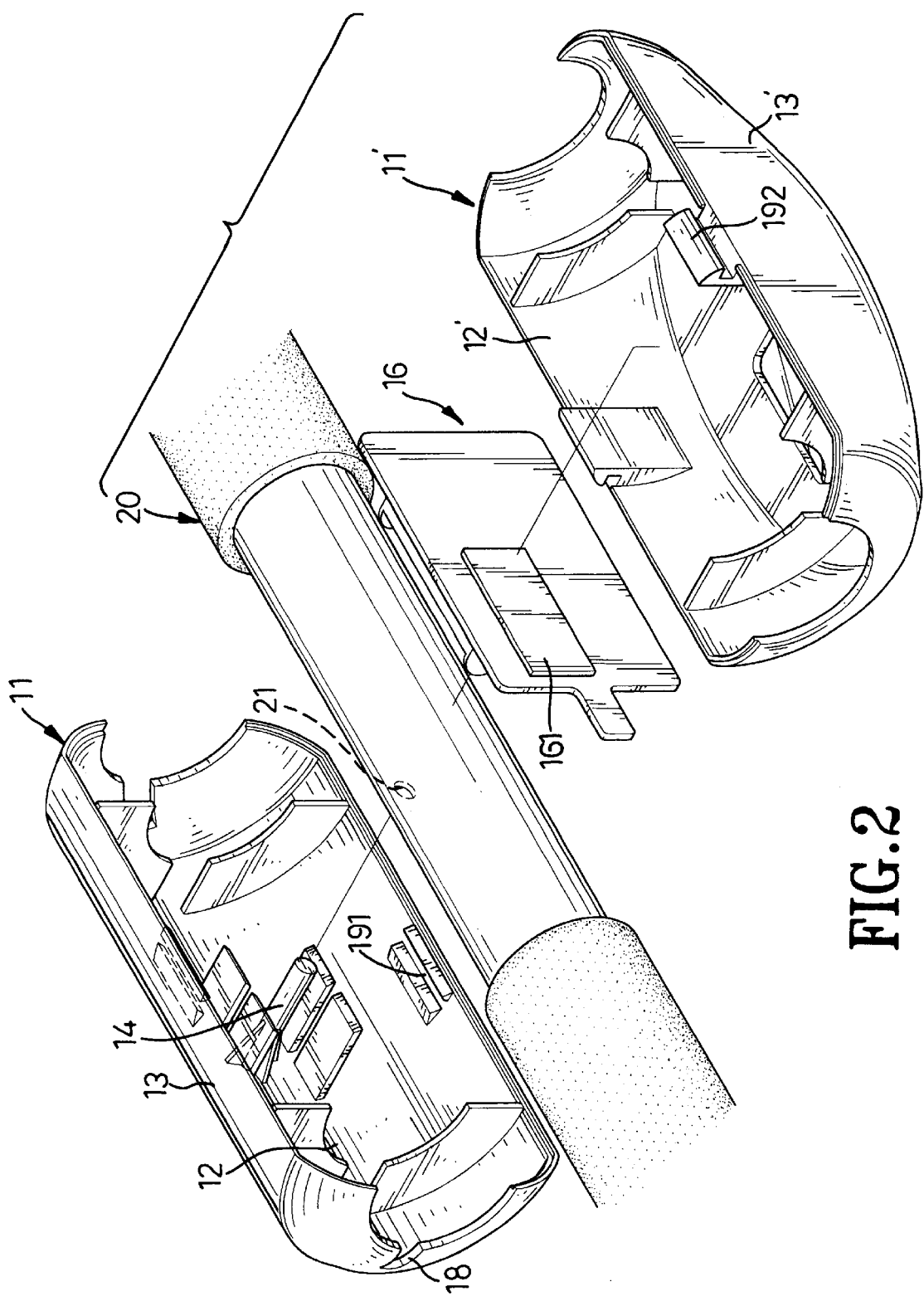
FIG. 2 is an exploded perspective view of the display in FIG. 1.

Generally speaking, exercise devices are constructed from metal tubes. With reference to FIGS. 1 to 2, a display for an exercise device in accordance with the present invention comprises a cylindrical housing (10), a PCB (16) and at least one pushbutton (152). The cylindrical housing (10) is mounted on a round support rod (20) of exercise device. A positioning hole (21) is formed in the support rod (20) of exercise device opposite to a direction from which the display is to be viewed. The housing (10) has an inner space (not numbered) and two open ends (not numbered) and consists of a rear half shell (11) and a front half shell (11'). Both the half shells (11, 11') have an inside surface (12, 12') and an outside surface (13, 13'). A positioning stub (14) corresponding to the positioning hole (21) is defined on the inside surface (12) of the rear half shell (11). A flat surface (15) with a window (151) is defined in the outside surface (13') of the front half shell (11'). At least one pushbutton (152) is mounted on the flat surface (15). A LCD panel (161) is mounted on the PCB (16). The PCB (16) is attached to the inside surface (12') of the front half shell (11') so the LCD panel (161) can be viewed through the window (151) in the flat surface (15). The pushbutton (152) is electrically connected to the PCB (16).

A notch (18) is defined in an edge of each open end on the rear half shell (11) of the housing (10). The notches (18) provide the means to connect an electric wire (not shown) between the PCB (16) and a sensor (not shown) on exercise device.

Figure 3:
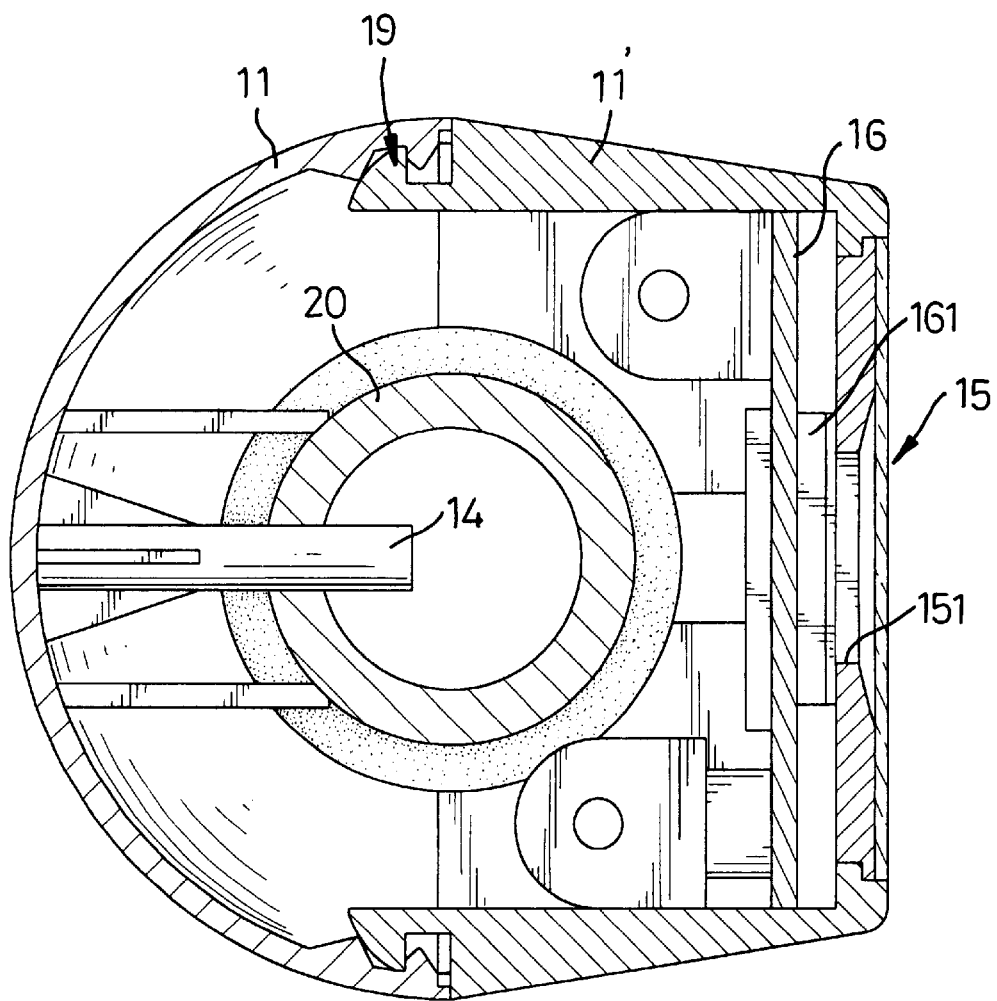
FIG. 3 is an operational exploded cross sectional side plan view of the display along line 3—3 in FIG. 1.
Figure 4:
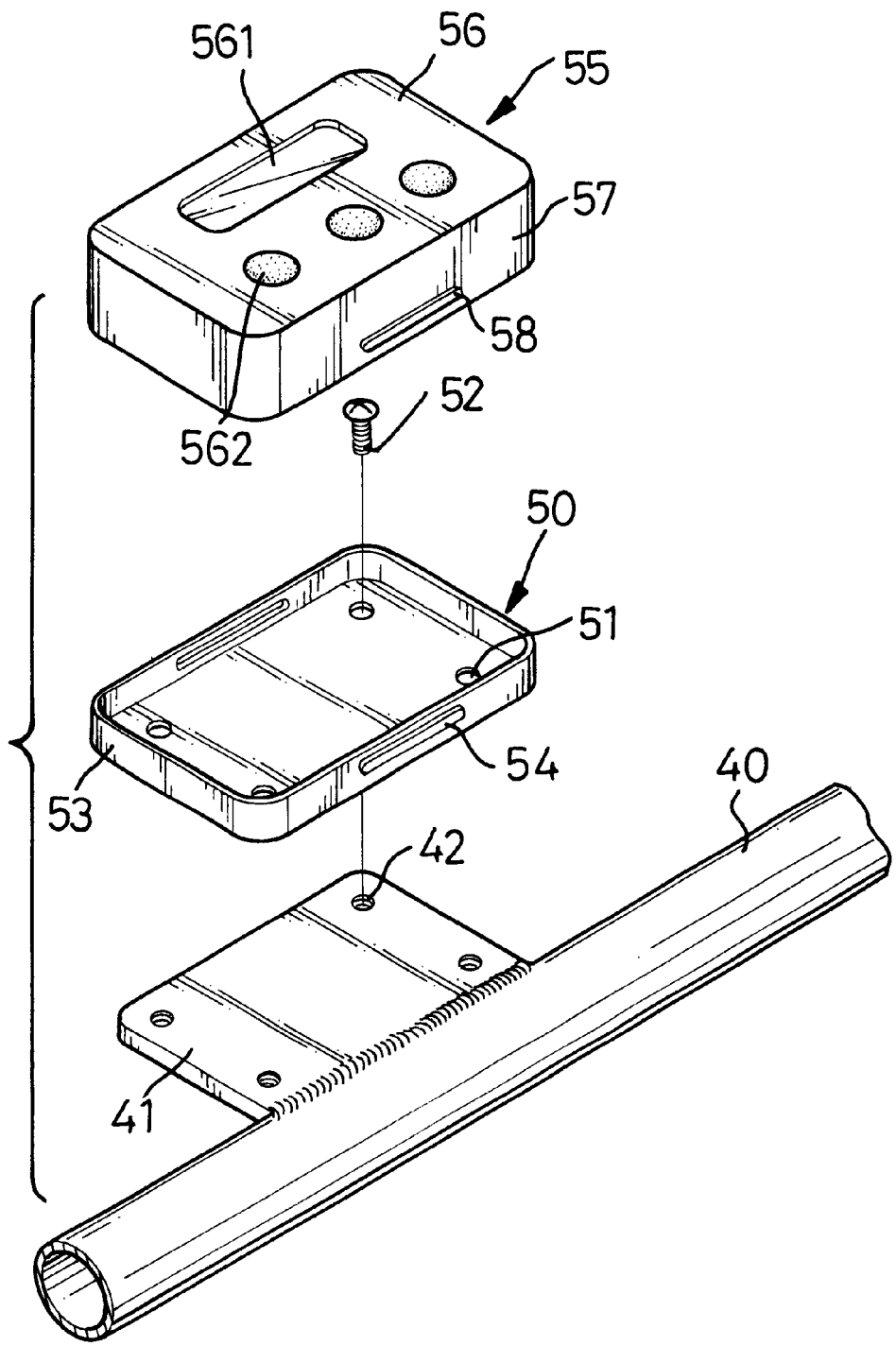
FIG. 4 is an exploded perspective view of a conventional display of an exercise device.

With reference to FIGS. 2 and 3, two fasteners (19) are defined respectively on the inside surface (12, 12') of the rear half shell (11) and the front half shell (11'). Each fastener (19) includes a groove (191) and a hook (192). The grooves (191) and hooks (192) are defined respectively on the different halfshells (11, 11'). The groove (191) is defined on the inside surface (12) of the rear half shell (11), and the hook (192) is defined on the inside surface (12') of the front half shell (11').

Consequently, the rear half shell (11) and the front half shell (11') wraps around the support rod (20), and the support rod (20) passes through the inner space and extends out through the open ends. The positioning stub (14) is mounted in positioning hole (21) to prevent the housing (10) from rotating around the support rod (20). The hooks (192) clamp into the grooves (191) to fasten the rear halfshell (11) and the front halfshell (11') together to form the housing (10) and securely mount the housing (10) on the support rod (20).

The display in accordance with the present invention has several advantages. Firstly, the hooks (192) and the grooves (191) connect the half shells (11, 11') thereby making installation or removal of the display easy. Secondly, the structure of the half shell is very simple and easy to produce thereby reducing the production cost and time.

Even though numerous characteristics and advantages of the present invention have been set forth in the foregoing description, together with details of the structure and function of the invention, the disclosure is illustrative only, and changes maybe made in detail, especially in matters of shape, size, and arrangement of parts within the principles of the invention to the full extent indicated by the broad general meaning of the terms in which the appended claims are expressed.

What is claimed is:

1. A display for an exercise device having a support rod with a positioning hole, the display comprising:
   a housing adapted to be securely attached to the support rod and having an inner space adapted for receiving the support rod and two open ends adapted for two ends of the support rod respectively extending out from the open ends, and the housing consisting of a rear half shell and a front half shell, both the half shells having an inside surface and an outside surface;
   a positioning stub adapted to be mounted in the positioning hole in the support rod and formed on the inside surface of the rear half shell;
   a flat surface formed on the outside surface of the front half shell and having at least one pushbutton mounted on and a window formed in the flat surface;
   a PCB with a LCD panel mounted on the inside surface of the front half shell so that the LCD panel can be viewed through the window in the flat surface, and the at least one pushbutton electrically connected to the PCB; and
   two fasteners defined respectively on the inside surface of both half shells to clamp the half shells together.

2. The display as claimed in claim 1, wherein each fastener consists of a groove and a hook corresponding to the groove, and the groove and the hook are defined on the inside surface respectively of different half shells.

3. The display as claimed in claim 1, wherein the housing is cylindrical, and a notch is defined on an edge of each open end of one of the half shells.

4. The display as claimed in claim 2, wherein the housing is cylindrical, and a notch is defined on an edge of each open end of one of the half shells.

* * * * *